United States Patent Office 3,173,060
Patented Mar. 9, 1965

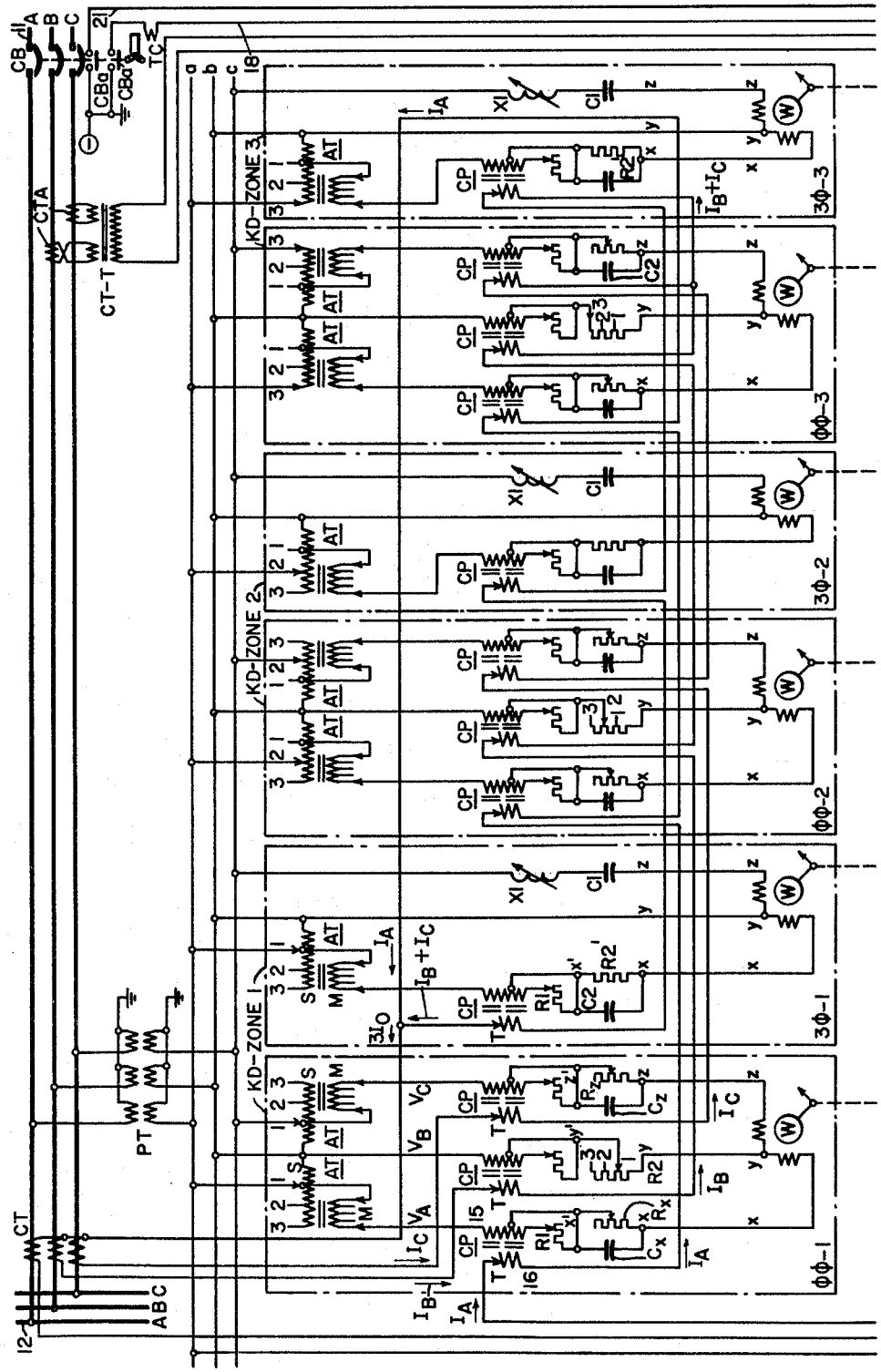
Fig. IA.

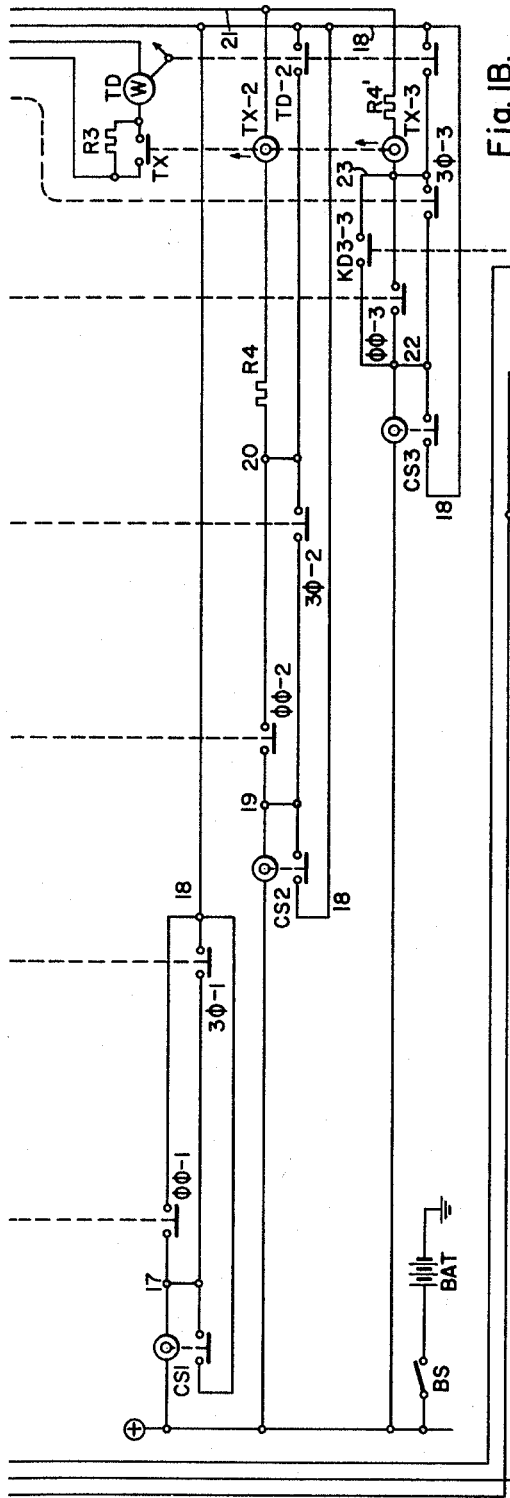
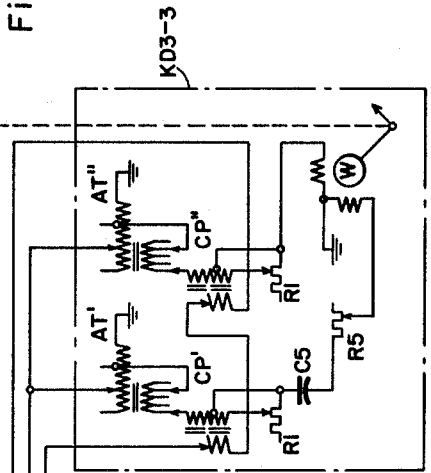
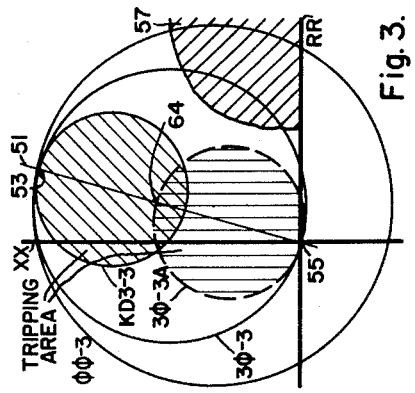
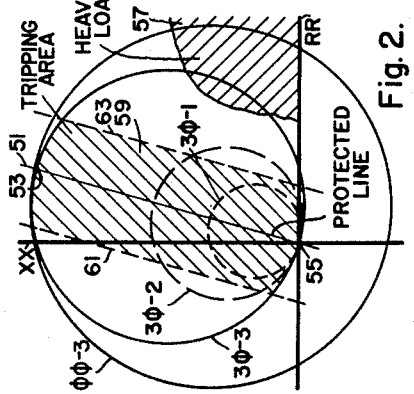

3,173,060
EQUIPMENT FOR PROTECTING ELECTRICAL SYSTEMS
Robert G. Lakin, Hanover Township, Morris County, N.J., assignor to Westinghouse Electric Corporation, East Pittsburgh, Pa., a corporation of Pennsylvania
Filed Jan. 5, 1961, Ser. No. 80,941
5 Claims. (Cl. 317—29)

This invention relates to equipment for protecting electrical systems and it has particular relation to distance-responsive relays for protecting electrical transmission lines.

It is desirable that equipment designed to respond to fault conditions on an electrical system by non-responsive to non-fault conditions. This may be considered with reference to relaying of the type discussed in three papers entitled "Compensator Distance Relaying" which appeared in the June 1958 issue of the American Institute of Electrical Engineers Transactions, Power Apparatus and Systems, published by the American Institute of Electrical Engineers, New York city, papers 58–26, 20 and 19.

The three-phase compensator relay discussed in the aforesaid three papers has a characteristic impedance circle which passes through the origin of the conventional R–X diagram. The characteristic impedance circle has a diameter sufficient to cover the line section to be protected. Any impedance condition invading the circle causes a tripping operation of the relay. On some systems this condition may be caused not only by a fault but by a heavy load or power swing or an out-of-step condition.

To prevent a false operation of the relay under a non-fault condition it is possible to provide a blocking relay which is responsive to the non-fault condition for disabling the three-phase compensator relay. Such a solution may place the tripping contacts of the three-phase relay in series with blocking contacts of the blocking relay which requires tripping current to pass through the blocking contacts. In addition the blocking relay may block for certain conditions in which a tripping operation is desired.

In a preferred embodiment of the invention the diameter of the characteristic impedance circle of a three-phase compensator relay is decreased to avoid the areas of the R–X diagram which can be invaded by a non-fault condition. This decreases the reach of the three-phase relay and it no longer protects a portion of the line-section to be protected. This portion is protected by an additional relay having a characteristic impedance circle which is small enough to avoid regions of the R–X diagram that can be invaded by a non-fault condition. The circle is offset in the forward direction to cover the desired portion of the line section.

The additional relay desirably has contacts in parallel with contacts of the three-phase compensator relay to provide independent, positive line protection.

My invention is particularly suitable for a relaying system similar to that disclosed in the Sonnemann patent application, Serial No. 685,155, and in the Goldsborough patent application, Serial No. 685,168, both filed September 20, 1957, now Patents 2,973,459 and 2,973,461, respectively.

It is, therefore, an object of the invention to provide a simplified and improved transmission-line protection system discriminating between fault and non-fault line conditions.

It is a further object of the invention to provide a transmission-line protection system employing plural protective units at a common relay station which are similarly responsive to fault conditions on different portions of a transmission line.

It is also an object of the invention to provide a protective device for an electrical system having two protective units providing impedance characteristic circles displaced from each other along the impedance line of the system.

It is another object of the invention to provide plural impedance relay units for protecting a transmission-line section wherein the relay units have characteristic circles smaller in diameter than the impedance of the section and offset to different extents along the impedance line of the section to provide similar protection for different portions of the section.

It is an additional object of the invention to provide a transmission-line protection system employing plural product-type relay units responsive similarly to fault conditions occurring on different portions of a transmission line, the portions overlapping.

With the foregoing and other objects in view, my invention consists in the apparatus, circuits, combinations and methods of operation, hereinafter described and claimed and illustrated in the accompanying drawings, wherein:

FIGURES 1A and 1B together constitute a diagrammatic view of the best form of embodiment of circuits and apparatus, which I at present prefer for embodying my invention in protective equipment for protecting a three-phase power-line against faults involving either two or three phases of the line;

FIG. 2 is a graphical representation of the characteristics of one form of protective equipment proposed for protecting an electrical system; and FIG. 3 is a graphical representation of the characteristics of the protective equipment shown in FIGS. 1A and 1B.

In FIG. 1A I show a compensator relaying system, applied for the protection of a three-phase line-section 11, which is connected to a three-phase bus 12, at the relaying station, through a circuit breaker CB. This system is similar to one disclosed in the aforesaid Sonnemann and Goldsborough patent applications. A set of line-current transformers CT derive the line-currents $I_A$, $I_B$, $I_C$ and the star-point current $3I_0$ for relaying purposes, where $I_0$ is the zero-sequence component of the line-currents. A set of potential transformers PT is used for deriving the line or bus-voltages $a$, $b$ and $c$ for relaying purposes.

In FIG. 1A, I show six relaying-units which I call Type KD units, two for each of the three zones of protection, namely, a phase-fault unit $\phi\phi$ for responding to all kinds of double-line faults, and a three-phase unit $3\phi$ for responding to three-phase faults, for each zone, the zones being indicated by appended numbers, such as the designation $\phi\phi$–1 for the first-zone phase-fault unit or element. I also show a time-delay element or timer TD, an auxiliary timer-starting relay TX, and three contactor-switches CS1, CS2 and CS3. The contacts of the circuit breaker CB and the various relay-elements are shown in their deenergized positions, and are regarded as being raised by the operation of the respective elements. The physical connections between the various relay-contacts and the various operating-coils of the respective relays are shown as dotted vertical stems, which are intended as a convention for indicating the mechanical connection between the parts of each relay-element. As a further convention, the same legends are applied, both to the force-producing or operating member, and to the contact-members of each relay-element, to denote their relationship. The timer TD has two contacts, which are distinguished as TD2 and TD3, which close after different time-delays suitable for the second-zone and third-zone relay, respectively.

Each of the six illustrated relaying-units operates on compensated voltages. Since the amount of the mutual compensator-impedance, which is required in the alternating-current relaying circuits, is directly proportional to the value of the derived bus-voltage which is used in said relaying circuits, I have shown, in FIG. 1A, a convenient means for aiding in adjusting the effective impedance-value of each compensator, by adjusting the value of the derived bus-voltage which is applied to the relaying circuits. To this end, I show a plurality of autotransformers AT, each having three adjustable primary-connection taps numbered 1, 2 and 3 on each main autotransformer-winding S. The secondary or output circuit of each autotransformer in FIG. 1 is permanently connected to the tap S1, and this secondary circuit serially includes some fine-adjustment taps on a tertiary winding M of the autotransformer which can add or subtract small fractional increments to the secondary voltage, according to the polarity of the connections to the M-taps. The output-circuit of the tertiary autotransformer-winding M produces the effective bus-voltage which is used in that phase of the relaying circuit.

In FIG. 1A, each of the compensators CP is provided with a tapped primary winding T, having a small number of turns, and a secondary winding 15, having a large number of turns, these two windings being magnetically interlinked through an air-gapped core 16 so that the compensator-voltage which is generated in the secondary winding 15 will be substantially 90°, or less, out of phase with the current which traverses the primary winding T, depending upon the amount of effective resistance R1. The provision of the air gap is desirable for the reason that the air gap compensator provides an effective transient shunt which tends to remove any direct-current transient from the energy supplied to the relays. The relays herein described are remarkably free of direct-current transient response.

The taps of the primary winding T of each compensator CP are numbered in various ohm-values which are so chosen that a correct replica of the positive-sequence line-impedance $Z_{BP}$ of the protected line 11, to a distance as far as the desired balance-point of the relay, will be obtained when $$Z_{BP} = \frac{TS}{(1 \pm M)}$$

where T, S and M are the numbers or fractional numbers which are marked on the chosen taps of the compensator-primary T, the main autotransformer-winding S, and the tertiary autotransformer-winding M, respectively. In this manner, I provide a very convenient means for setting the mutual impedance of the compensator to have an ohmic value which matches the line-impedance of any given line 11 at any balance-point distance from the relaying station, at which it is desired for the relay to have a zero response or a balance-point. While this particular type of balance-point compensator-adjustment is preferred, I am, of course, not limited altogether thereto.

For the best results, the impedance-angle of the compensator-impedance should match the impedance-angle of the particular transmission line 11 which is being protected. In accordance with an invention which is described and claimed in an applicaton of Howard J. Calhoun, Serial No. 685,167, filed September 20, 1957, now Patent 2,973,460, FIG. 1A shows a preferred way to adjust the phase-angle relation between the primary current of each compensator and its secondary voltage, without using large values of resistance, and without causing much change in the mutual impedance or the output-voltage of the compensator as a result of changes in the angle-adjustments. To this end, a small percentage of the total number of turns of the secondary winding 15 of each compensator CP are shorted through a variable resistance R1, which can be varied from R1=0, to provide a minimum impedance-angle, to R1=600 ohms, to provide a maximum impedance-angle of approximately 85° (for example); or the resistance R1 may be infinity, or an open circuit, to provide an impedance-angle of substantially 90°. The combination of a small value of resistance R1 and few shorting turns on the secondary winding 15 not only reduces the compensator-burden, but it also results in a minimum change in the mutual impedance when the value of the resistance R1 is changed for the purpose of adjusting the compensator for lines of different impedance-angles. This provides the best means which has heretofore been devised for accomplishing this purpose.

Referring, now, to the phase-fault units $\phi\phi$-1, $\phi\phi$-2 and $\phi\phi$-3 of the three zones, 1, 2, and 3, of the Type KD relaying system shown in FIG. 1A, each unit uses three identical compensators CP, connected in series with the respective open-delta voltage-terminals $V_A$, $V_B$ and $V_C$ which are supplied by two autotransformers AT. One of these two autotransformers AT has its primary connection across the delta phase $ba$ of the potential transformer bus $abc$, while the other autotransformer has its primary connection across the delta phase $bc$. The three phase-fault relay units $\phi\phi$-1, $\phi\phi$-2 and $\phi\phi$-3, are designed to respond to line-to-line faults and to double-line-to-ground faults. Said units are all alike, except for their different distance-settings, or the different impedance-settings of their compensators CP, as indicated by the choice of the S-taps 1, 2 and 3, respectively, for the first, second and third zones, as shown in FIG. 1A.

The output-circuits of the two autotransformers AT of each phase-fault relay-unit, such as the unit $\phi\phi$-1, thus provide an adjustable three-phase derived bus-voltage $V_A$, $V_B$, $V_C$. The primary windings T of the three compensators CP of each of these phase-fault units, such as $\phi\phi$-1, are energized from the respective derived line-currents $I_A$, $I_B$ and $I_C$ which are supplied by the line-current transformers CT. The three compensators CP subtract their respective compensator-voltages from the corresponding phases of the derived bus-voltages $V_A$, $V_B$ and $V_C$, producing a three-phase compensated voltage at the points $x'$, $y'$, and $z'$ as shown for the relay-unit $\phi\phi$-1 in FIG. 1A.

The compensated voltages $x'$, $y'$ and $z'$ of each phase-fault relaying-unit, such as $\phi\phi$-1 in FIG. 1A, are used to energize a suitable type of relay, such as a torque-producing relaying element which produces no torque at all (that is, it has a balance-point), when the positive and negative-sequence components of the impressed three-phase voltages $x'$, $y'$, $z'$ are equal to each other (which is the case when the voltage-triangle has collapsed to a single line or phase), or when said voltage-triangle has completely collapsed to a point. Said torque-producing relay-element has an actuating torque when the negative-sequence voltage-component predominates, while it has a restraining or non-actuating torque when the positive-sequence component predominates. Any suitable torque-producing element which answers this basic description will suffice, whether it is a balanced element, like a three-phase induction motor, in which the internal impedances and angular spacings of the element are alike in each phase, or whether said torque-producing element is an unbalanced element, such as a two-circuit element, the two circuits of which are energized from different voltages derived from the impressed three-phase voltages $x'$, $y'$, $z'$. A suitable construction for the relay is shown in the Marieni Patent 2,949,515, and in the aforesaid Sonnemann patent application.

There are advantages in using a two-circuit torque-producing element, as diagrammatically indicated by the watt-meter type of single-phase relay-element W in each of the six relaying units $\phi\phi$-1, $3\phi$-1, $\phi\phi$-2, $3\phi$-2, $\phi\phi$-3 and $3\phi$-3 as diagrammatically indicated in FIG. 1A. There are various ways in which the two circuits for each of these torque-producing elements may be energized, from any two differing voltages which may be derived from different phases of the three-phase compensated voltages, such as $x'$, $y'$, $z'$ of FIG. 1A.

In the particular circuit-connections which are shown for $\phi\phi$-1 relay-unit in FIG. 1A, the two-circuit torque-producing element W has one winding-circuit xy energized across the delta-phase $x'y'$ of the compensated three-phase voltages $x'y'z'$, while its other winding-circuit $zy$ is energized across the delta-voltage phase $z'y'$. If the circuit-connections to and within the two-circuit torque-producing element W are such that no zero-sequence currents can flow in this element, as in the connections shown for the $\phi\phi$–1 unit in FIG. 1A, then the torque-producing element will have no hybrid, balance-point-shifting responses to the product of the zero and positive-sequence relay-currents or to the product of the zero and negative-sequence relay-currents.

As described and claimed in the aforesaid Calhoun application, it is desirable, for best operation, in the phase-fault units, such as $\phi\phi$–1 of FIG. 1A, to balance both the steady-state and the transient impedance-angles in the three circuits leading up to the common connection $y$ of the wattmeter-element terminals $xyz$. This refers to the impedances which are connected between the bus-voltage terminal $a$ and the relay-terminal $y$, the impedances which are connected between the bus-voltage terminal $b$ and the relay-terminal $y$, and the impedances which are connected between the bus-voltage terminal $c$ and the relay-terminal $y$.

As described and claimed in the aforesaid Calhoun application, the impedance-angles in these three circuits are kept substantially equal, notwithstanding the angle-changes which are introduced by changing the primary taps S1, S2 and S3 on the autotransformers AT, by introducing a resistance R2 in circuit between the points $y'$ and $y$, and providing this resistance R2 with three taps, also numbered 1, 2 and 3, which are changed simultaneously with the S-taps of the autotransformers. Dissimilar transient effects, due to sudden bus-voltage changes in the three circuits $ay$, $by$ and $cy$, are compensated for by serially including capacitors $C_x$ and $C_z$ between the points $x'$ and $x$ and between the points $z'$ and $z$, respectively to compensate for the inductive reactances in these circuits. The effective values of these angle-adjustment capacitors $C_x$ and $C_z$ are adjustable by means of parallel-connected adjustable resistances $R_x$ and $R_z$, respectively.

These transient-suppressing circuit-portions $(C_xR_x)$, R2 and $(C_zR_z)$ balance the phase-angles of the impedances of the three circuits $ay$, $by$ and $cy$, with open primaries on the three compensators CP. Thus, when a close-in phase-to-phase fault occurs, behind the current transformers CT, one of the delta bus-voltages $V_{AB}$, $V_{BC}$, or $V_{CA}$ is collapsed to zero. If we assume the extreme system-condition of no back-feed current over the line which is being protected, the compensators do nothing to alter this collapsed voltage. Under this condition, there should be no spurious torque in the relay to cause it to respond incorrectly. These transient-suppressing elements prevent such spurious response as might otherwise be occasioned by the sudden change in the bus-voltages in the extreme case in which there may be no current in the primaries of the compensators.

FIG. 1A also shows three three-phase-fault-responsive relays 3$\phi$–1, 3$\phi$–2 and 3$\phi$–3, one for each of the three zones. These particular relays embody the basic concept of an invention of S. L. Goldsborough, as described and claimed in his application Serial No. 685,168, filed September 20, 1957. These three three-phase relays are all alike, except for their distance-settings which are changed in much the same manner as has been described for the phase-fault relays $\phi\phi$–1, $\phi\phi$–2, $\phi\phi$–3, so that a description of one, say the three-phase element 3$\phi$–1, will suffice for all.

A principal characteristic feature of this three-phase fault-responsive relay 3$\phi$–1, as distinguished from the phase-to-phase fault-responsive relay $\phi\phi$–1, is that the three-phase relay 3$\phi$1 uses only a single compensator CP, which has 1.5 times the effective mutual impedance of each of the three compensators CP which are used in the phase-fault relay $\phi\phi$–1. The phase in which this single compensator CP is connected, in the relay-unit 3$\phi$–1 of FIG. 1A is designated as phase A. This three-phase unit 3$\phi$–1 uses a single autotransformer AT, which is similar to the autotransformers which have been described for the phase-fault relay $\phi\phi$–1. This single autotransformer AT is connected between the phases $b$ and $a$ of the relaying bus $abc$, so as to provide the adjustable voltage $V_A$, which is phase A of the three-phase bus-voltages which are used for energizing the torque-producing element W of this three-phase unit 3$\phi$–1, the other two bus-voltage phases being the phases $b$ and $c$, unchanged.

In the three-phase unit 3$\phi$–1, the single compensator CP has its secondary winding 15, with some of its turns shorted through a mutual-impedance angle-controlling resistor R1, connected in series with the bus-voltage terminal $V_A$, to produce the compensated voltage $x'$, as described for the phase fault relay $\phi\phi$–1, remembering that the compensator CP in the three-phase relay 3$\phi$–1 has as impedance-setting which is 1.5 times as high as in the phase-fault relay $\phi\phi$–1.

In the case of the three-phase relay 3$\phi$–1 which is shown in FIG. 1A, the compensator-primary T is traversed by the current $-(I_B+I_C)$, which is equal to $(I_A-3I_0)$, where $I_0$ is the zero-sequence component of the line-current, as derived by the current-transformers CT, as described and claimed in an application of J. G. Chevalier, Serial No. 685,277, filed September 20, 1957, now Patent 2,973,462.

The cylinder-unit W, which is used in the three-phase relay-element 3$\phi$–1 in FIG. 1A, is basically a two-phase induction motor which produces torque in a direction which is determined by the phase-angle between the two voltages, and in a magnitude which is responsive to the product of the two voltages which are impressed upon the torque-producing element multiplied by the sine of the phase-angle between the two voltages. When a three-phase fault occurs close to the bus 12 at the relaying terminal of the protected line 11, all of the delta voltages of the bus will collapse to zero. And since the three-phase element 3$\phi$–1 uses only one compensator CP, there will be a voltage $x'$ in only one phase of the three-phase voltages which are supplied to the torque-producing cylinder-unit W, this phase being the phase which contains the compensator CP. This provides energization for the phase-winding $xy$ of the torque-element W. However, the energization for the other phase-winding $zy$ of the torque-element collapses to zero, in response to a three-phase line-fault near the bus, which means that the torque-element, if it responded at all under such conditions, would have only a momentary transient response, as a result of its memory-action as the uncompensated $zy$ voltage is collapsing to zero.

In order that the three-phase fault-responsive unit 3$\phi$–1 may react, with accuracy or intelligence, to a three-phase line-fault close to the relaying station 12, it is desirable not only to sustain a sufficient magnitude of the uncompensated bus-voltage $zy$ which is applied to the torque-producing element, so that there can be a sufficient torque to operate the relay, but also to sustain or maintain the proper phase-angle between the two relay-voltages $xy$ and $zy$, long enough for the relay to react at all, and to know in which direction to react, because the relay-torque is determined by the product of the magnitudes of the impressed voltages, multiplied by the sine of the phase-angle between these two voltages.

As described and claimed in the previously mentioned Calhoun application, the uncompensated $zy$ voltage on the torque-element W of the three-phase unit 3$\phi$–1 is sustained, for a sufficiently long time, by a memory-circuit comprising a serially connected capacitor C1 and an adjustable choke-coil X1, connected in series between the bus-terminal $c$ and the terminal $z$ of the torque-producing element W. It is necesary that the duration or decrement of the memory-action of this memory-circuit C1, X1 shall be sufficiently long to enable the torque-element to produce any torque at all by the end of the time within which said torque-element must accurately respond, but it is also necessary that the tuning of the circuit which includes the memory-circuit C1, X1 shall be substantially equal to the line-frequency of the protected line 11, so that the oscillating current in this tuned circuit will not get much out of phase with the corresponding line-frequency current, during the number of line-frequency cycles during which it is necessary for the torque-element to respond, with a positive torque for faults in front of the relaying station, or with a negative torque for faults behind the relaying station.

However, the introduction of the capacitor C1 of the memory-circuit, in the relaying unit $3\phi$–1 of FIG. 1A, necessarily introduces a transient disturbance, which is suppressed or compensated for, in accordance with the Calhoun invention, by connecting a second capacitor C2 between the points $x'$ and $x$, in the compensated-voltage phase $x$ of said torque-element $3\phi$–1 of FIG. 1A, this second capacitor C2 being shunted by a resistor R2' which not only enhances the effect of the capacitor C2, but also enables said capacitor to suppress transients with as little memory-action as possible.

The relaying equipment which is shown in FIG. 1A requires a timer, such as TD, which is available whenever there is a line-fault involving at least two of the line-phases. While I am not limited as to exact details, I prefer to use a single-phase timer TD, which receives an energizing current whenever a fault-current is flowing, involving at least two of the line-phases. By way of example, I have shown the timer TD as being a motor-element M which is energized from the secondary winding of a saturable many-turn current-transformer CT–T, which in turn has two primary windings connected to current transformers CTA to be energized, for example, respectively by the line-currents $I_B$ and $I_C$. The primary windings are connected to supply a resultant energization to the transformer which is responsive to the difference between the line currents $I_B$ and $I_C$.

The timer-motor TD is connected in series with the normally open make-contact TX of an auxiliary timer-relay TX. This make-contact TX is bypassed by a resistance R3, which is sufficiently small to avoid substantially open-circuiting the current-transformer CT–T when said contact TX is open, but the resistance R3 is sufficiently large to prevent the timer TD from operating when said resistance is connected in series with it.

The six fault-responsive elements of FIG. 1 have correspondingly numbered make-contacts $\phi\phi$–1, $3\phi$–1, $\phi\phi$–2, $3\phi$–2, $\phi\phi$–3 and $3\phi$–3, which are used to control certain relaying-circuits which are shown as being energized from a positive direct-current bus (+).

The first circuit which is connected to the positive bus (+) in FIG. 1A is a first-zone tripping-circuit which includes the operating-coil of a contactor-switch CS1, then a circuit 17, then the make contact $\phi\phi$–1 of the first-zone phase-fault unit $\phi\phi$–1, then a tripping-circuit 18, which extends up through the trip-coil TC of the circuit breaker CB, and finally through an auxiliary circuit-breaker make-contact CB$a'$ to a negative bus (−), the circuit-breaker make-contact CB$a'$ being closed when the circuit breaker CB is closed, the circuits being illustrated, however, with all switches and relays open or deenergized. Two branch-circuits are also provided between the points 17 and 18 of the first-zone protective-relaying equipment, these two branch circuits including, respectively, the make-contact $3\phi$–1 of the first-zone three-phase unit $3\phi$–1, and the make-contact CS1 of the contactor-switch CS1.

A second-zone relaying-circuit is next shown in FIG. 1A, extending from the positive bus (+) through the energizing-coil CS2 of a second contactor-switch CS2, then to a circuit 19, then through the make-contact $\phi\phi$–2 of the second-zone phase-fault unit $\phi\phi$–2 to a circuit 20, then through a resistor R4 and through an operating-coil TX–2 of the auxiliary timer-relay TX to a circuit 21, which extends up through an auxiliary make-contact CB$a$ of the circuit breaker CB, and thence to the negative bus (−). The two circuits 19 and 20 are joined also by a branch-circuit which includes the make-contact $3\phi$–2 of the second-zone three-phase unit $3\phi$–2. Consequently, the circuit 20 is energized as a result of the response of either one of the two second-zone units $\phi\phi$–2 or $3\phi$–2. This circuit 20 thus energizes the auxiliary timer-relay TX, which initiates the movement of the timer TD, whenever there is a line-fault which activates either one of the second-zone relays.

The aforesaid circuit 20 is also used to trip the circuit breaker CB at the end of a predetermined time which is determined by the closure of the second-zone contact TD2 of the timer TD, which thereupon energizes the trip-circuit 18 from the circuit 20. The TX coil TX–2, either because of its built-in resistance, or because of an externally connected resistance R4, does not draw sufficient current from the circuit 20 to pick up the second contactor-switch CS2, but the trip-coil TC draws a very heavy current as soon as the second-zone timer-contact TD2 closes, thus causing the second contactor-switch CS2 to pick up and close its make-contact CS2, which completes a circuit-connection between the circuits 19 and 18, thus sealing-in the second-zone tripping-response.

A third relaying-circuit is connected, in FIG. 1A, from the positive bus (+) through the operating coil of a third contactor-switch CS3, then to a circuit 22, then to two branch-circuits, one extending from the circuit 22 through the make-contact $\phi\phi$–3 of the third zone phase-fault unit $\phi\phi$–3 to a circuit 23, the second branch-circuit extending from the circuit 22 through a make contact $3\phi$–3 of the third zone three-phase unit $3\phi$–3 to said circuit 23. From the circuit 23, a first branch-circuit continues through a second operating-coil TX–3 of the auxiliary timer-relay TX, the resistor R4', and thence to the circuit 21, so that the auxiliary timer-relay TX will initiate the movement of the timer TD whenever there is a line-fault which activates either one of the third-zone relays.

A second branch-circuit of the circuit 23 is provided, to make connection to a third-zone timer-contact TD3 which closes after a longer time-interval than is required for the closure of the second-zone contact TD2 of the timer TD. The third-zone timer-contact TD3 energizes the trip-circuit 18 from the circuit 23, and when this happens, the third contactor-switch CS3 is energized, picking up its make-contact CS3, and closing a circuit-connection between the conductors 22 and 18.

At the bottom of FIG. 1A, the positive bus (+) is shown as being energized, through a battery-switch BS, from the positive terminal of a battery BAT, the negative terminal of which is grounded, to connect with the grounded negative bus (−).

The operation of portions of FIG. 1A is set forth in greater detail in the aforesaid Sonnemann patent application.

Typical characteristics of certain of the relay units of FIG. 1A are shown in FIG. 2. This figure shows characteristic impedance circles or conventional R–X diagrams for the relay units $\phi\phi$–3 and $3\phi$–3 of FIG. 1A. In the diagram of FIG. 2 ordinates represent reactance and abscissas represent resistance of the line section "seen" by the relay units.

The protected line-section is represented in FIG. 2 by a line 51. The circles of the relay units pass through a point 53 which represents the balance point of the line-section and have diameters large enough to include the relay station 55 on the protected line-section which is located at the intersection of the coordinate axes of the diagram.

It is sometimes difficult to set the relay units to respond to fault conditions and to ignore all load conditions. For example, let it be assumed that due to a heavy load or a system power swing or an out-of-step condition a load impedance can be produced which falls within the shaded region 57 of FIG. 2. This shaded region invades both circles. However, inasmuch as the unit φφ–3 does not respond to a balanced-load condition, this invasion does not affect the operation of the unit φφ–3.

The three-phase unit 3φ–3 can respond to a balanced-load condition. Consequently the invasion of the circle for the unit 3φ–3 by the area 57 can result in false or undesirable operations of the relay unit 3φ–3.

Typical characteristic impedance circles for the relay units 3φ–1 and 3φ–2 also are shown in FIG. 2. These relay units customarily are adjusted to protect line sections which are shorter than that protected by the relay unit 3φ–3. It will be noted that the illustrated circles 3φ–1 and 3φ–2 are clear of the region 57 and do not present the problem of false operations discussed for the relay unit 3φ–3.

In order to avoid false operations the circle for the relay unit 3φ–3 may be replaced by a tripping area which protects the desired line-section but which avoids the region 57. Such a tripping area is represented in FIG. 2 by a limited shaded area 59 bounded by dotted lines 61 and 63 and arcs of the characteristic impedance circle. This limited area provides protection for the desired line-section but is clear of the region 57.

The dotted lines 61 and 63 may be defined by supervisory or blocking relay equipment having contact means in series with the contacts of the relay unit 3φ–3 to prevent a circuit breaker tripping operation by the relay 3φ–3 for impedance values outside the shaded area 59.

In a preferred embodiment of the invention a pluality of relay units are provided each having a charenough to avoid the region 57, the circles being spaced acteristic impedance circle which has a diameter small enough to avoid the region 57, the circles being spaced along the line 51 to provide adequate protection for the desired line section. If two relay units are employed in this manner, they may have characteristic impedance circles as shown in FIG. 3.

In FIG. 3 certain circles of FIG. 2 are reproduced. In accordance with the invention the relay unit 3φ–3 is adjusted to provide a circle 3φ–3A which is clear of the region 57. Because of the reduced reach represented by the circle 3φ–3A, the relay circle 3φ–3A protects a reduced portion of the desired line section, the reduced portion being between the points 55 and 64 in FIG. 3.

To protect the portion of the line-section between the points 64 and 53 in FIG. 3, an additional relay unit KD3–3 is provided which has a characteristic represented by the circle KD3–3. This circle is small enough to clear the region 57 and is offset in a forward direction to protect the portion of the line section between the points 64 and 53. To assure protection throughout the line section the circles 3φ–3A and KD3–3 preferably have a substantial overlap as shown. The protection afforded by the relay units 3φ–3 and KD3–3 is represented by the shaded areas within their circles and protects the entire desired line section from the relay station to the balance point 53.

A suitable relay unit KD3–3 is represented in FIG. 1B. This unit includes an element W which responds to the product of two compensated voltages multiplied by the sine of the angle between such compensated voltages. For present purposes it will be assumed that this element is similar to the element W employed for the KD relay units.

For energizing the element W of the relay unit KD3–3 two autotransformers AT' and AT" are provided which may be similar in construction to the autotransformers AT previously described. The primary windings of the autotransformers AT" and AT' are connected in parallel for energization in accordance with the voltage between the a-phase of the derived bus voltage which is applied to the relaying circuits and ground.

The secondary or output of the autotransformer AT' is connected across a first or polarizing winding of the element W through the secondary winding of a compensator CP', a phase shifter represented by a capacitor C5 and an adjustable resistor R5 for calibration. The compensator CP' may be similar to the compensators CP which have been previously described. The capacitor C5 shifts the phase of the voltage applied to the polarizing winding of the element W by substantially 90°.

The secondary or output of the autotransformer AT" is connected across the remaining or operating winding of the element W through the secondary winding of a compensator CP" which may be similar to the previously-described compensators CP.

When the element W of the relay unit KD3–3 operates into tripping condition it closes contacts which are connected in parallel with the contacts of the relay units φφ–3 and 3φ–3.

The relay unit KD3–3 is adjusted to provide the characteristic impedance circle shown in FIG. 3. By adjustment of the resistors R1 the maximum torque angle of the relay unit may be adjusted. The compensator CP' adjustment controls the offset of the characteristic impedance circle whereas the compensator CP" adjustment controls the diameter of the circle.

The relay unit KD3–3 has been described as associated with the relay unit 3φ–3 to provide zone 3 protection. A relay unit similar to the relay unit KD3–3 may be associated in a similar manner with either of each of the relay units 3φ–1 and 3φ–2. However as previously pointed out, because of the shorter reach usually provided for the relay units 3φ–1 and 3φ–2, they do not respond to the load conditions represented by the shaded region 57 in the usual systems. For this reason it will be assumed that a relay similar to the relay KD3–3 is not required for either zone 1 or zone 2.

Although the invention has been described with reference to certain specific embodiments thereof numerous modifications falling within the spirit and scope of the invention are possible.

I claim as my invention:

1. In a relaying assembly for protecting a three-phase alternating-current electrical transmission line having a relaying station and extending for a substantial distance away from the relaying position, a first three-phase-fault-responsive relay unit coupled to the transmission line at the relaying station for operating from a non-tripping condition to a tripping condition in response to a three-phase fault on the transmission line only if such fault occurs within a predetermined distance from the relaying station, a second three-phase-fault-responsive relay unit coupled to the transmission line at the relaying station for operating from a non-tripping to a tripping condition in response to a three-phase fault on the transmission line only if such fault occurs in a zone extending from a point within said predetermined distance and spaced from the relaying station to a point spaced from the relaying station beyond said predetermined distance, and a tripping unit common and coupled to said first and second relay units, said tripping unit being responsive within substantially the same time to operation of each of said relay units to tripping condition.

2. In a relaying assembly for protecting a three-phase alternating-current electrical transmission line, first and second three-phase relay units having tripping and non-tripping conditions; each of said relay units comprising voltage and current input terminals and being responsive to impedance values represented by voltage and current inputs to the associated input terminals, each of said relay units being operable from a non-tripping condition to a tripping condition in response to an impedance represented by the voltage and current inputs to the associated input terminals which falls within a characteristic impedance circle plotted on a conventional R–X diagram for the associated relay unit; said first relay unit having a first characteristic impedance circle which includes the origin of the R–X diagram, said second relay unit having a second characteristic impedance circle which is spaced from the origin of the R–X diagram, said first and second circles overlapping each other, a common output circuit for said relay units, said output circuit having a tripping condition and a non-tripping condition, said relay units including means responsive to operation of each of said relay units independently from non-tripping to tripping conditions for altering the condition of said output circuit from non-tripping to tripping condition in substantially the same time.

3. In a protective assembly for protecting an electrical system including a three-phase alternating-current electrical transmission line having a relaying station and extending for a substantial distance away from the relaying station a circuit breaker for connecting portions of the system, first and second three-phase impedance relay units located at said station and having tripping and non-tripping condition, each of said relay units being coupled to said transmission line for energization by voltage and current inputs derived from said line for response to the line impedance from the relaying station to a ponit at which a three-phase fault occurs, the first relay unit being constructed for operation from non-tripping to tripping condition in response to occurrence of a three-phase fault on the transmission line at any point within a predetermined distance from the relaying station and being non-responsive for such operation to a three-phase fault occurring on the line beyond said predetermined distance, said second relay unit being constructed for operation from non-tripping to tripping condition in response to occurrence of a three-phase fault on the transmission line at any point along a length of the line extending from a position within said predetermined distance and spaced from said relaying station to a position beyond said predetermined distance, said second relay unit being non-responsive for such operation to a three-phase fault occurring on the line between said relaying station and said length, and means responsive to operation of each of said relay units independently from non-tripping to tripping condition for tripping the circuit breaker in substantially the same time.

4. A protective-relaying combination located at a relaying station for responding to balanced faults on a three-phase transmission line including means energized from the line voltage at the relaying station for producing a set of derived polyphase voltages having a phase-sequence corresponding to the line voltages, compensating means including a first compensator connected in series with one of said derived voltages and having substantially the same impedance angle as the line impedance of said transmission line for producing when the compensator is energized a set of compensated polyphase voltages wherein the compensated polyphase voltages includes at least one voltage derived at the relay station which represents a relay station line voltage compensated by a function of the voltage drop in a section of the line, means for energizing the compensator in accordance with line current flowing in the corresponding line-conductor of the three-phase transmission line, a first two-circuit polyphase relay element energized from said compensated polyphase voltages for response in a first manner to a function of the impedance of said transmission line under balanced-fault conditions to provide protection against balanced faults occurring on a first portion of the transmission line extending in a first direction from the relaying station, a second two-circuit polyphase relay element, means energizing each of the circuits of the second two-circuit polyphase relay element in accordance with a single-phase voltage derived from said transmission line, phase shifting means for establishing a phase difference between the energizations of the two circuits of the second two-circuit polyphase relay element, separate compensating means including a second compensator connected in series with the energization supplied to each of the two circuits of the second two-circuit polyphase relay element, means energizing said second compensators in accordance with a line current of said transmission line for response in a manner similar to said first manner to a function of the impedance of said transmission line under balanced fault conditions to provide protection against balanced faults occurring in a second portion of the transmission line which overlaps a part only of said first portion and which extends beyond said first portion in said first direction, and common protective translating means similarly responsive to operation of either of said relay elements.

5. A protective relaying combination located at a relay station for responding to certain faults on a three phase transmission line, including a circuit breaker for segregating parts of the transmission line, a first zone relay distance unit responsive to first impedance conditions corresponding to a fault occurring on a first zone of the transmission line extending in a first direction from the relaying station for tripping the circuit breaker, an additional zone relay distance unit responsive to second impedance conditions corresponding to a fault occurring in a certain zone of the transmission line extending in said first direction beyond the first zone for tripping the circuit breaker after a substantial time delay greater than the time required for a tripping operation of the circuit breaker by opeation of the first zone relay distance unit, said additional zone relay distance unit comprising a first relay distance element responsive to impedance conditions corresponding to a fault located in a first part only of the certain zone of the transmission line extending from the relaying station and terminating short of the end of the certain zone, and a second relay distance element responsive to impedance conditions corresponding to a fault located in part only of the certain zone of the transmission line extending from the end of the certain zone remote from the relaying station towards the relaying station and overlapping the first part and terminating short of the relaying station, each of said distance elements being effective in operating for tripping the circuit breaker with said substantial time delay.

References Cited by the Examiner
UNITED STATES PATENTS

| 2,386,209 | 10/45 | Goldsborough | 317—29 |
| 2,405,081 | 7/46 | Van C. Warrington | 317—36 |

FOREIGN PATENTS

| 984,088 | 7/51 | France. |

SAMUEL BERNSTEIN, *Primary Examiner.*